(12) United States Patent
Coscarella

(10) Patent No.: US 7,762,282 B2
(45) Date of Patent: Jul. 27, 2010

(54) CLOSURE FOR A PLUMBING CLEANOUT

(76) Inventor: Gabe Coscarella, 15703-64 Street, Edmonton, Alberta (CA) T5Y 2N5

( * ) Notice: Subject to any disclaimer, the term of this patent is extended or adjusted under 35 U.S.C. 154(b) by 43 days.

(21) Appl. No.: 11/135,006

(22) Filed: May 23, 2005

(65) Prior Publication Data
US 2005/0263201 A1 Dec. 1, 2005

(30) Foreign Application Priority Data
May 21, 2004 (CA) .................................. 2470505

(51) Int. Cl.
*F16L 55/10* (2006.01)
(52) U.S. Cl. .................. 138/89; 138/96 R; 215/306; 215/270; 220/803; 220/804
(58) Field of Classification Search ............... 138/96 T, 138/96 R, 89, 90; 4/239, 295, 287, 286; 215/355, 364, 306, 210, 260; 220/203.01, 220/203.11, 203.12, 203.13, 203.29, 801, 220/802–804, 375
See application file for complete search history.

(56) References Cited

U.S. PATENT DOCUMENTS

| | | | | | |
|---|---|---|---|---|---|
| 1,640,969 A | * | 8/1927 | Westerman | ............... | 138/96 T |
| 1,771,522 A | * | 7/1930 | Berge | ............... | 138/96 T |
| 2,277,713 A | * | 3/1942 | Parker | ............... | 138/96 T |
| 2,893,437 A | * | 7/1959 | Rickard | ............... | 138/96 T |
| 3,578,200 A | * | 5/1971 | Hetzer | ............... | 220/787 |
| 3,675,685 A | * | 7/1972 | Potter | ............... | 138/89 |

* cited by examiner

*Primary Examiner*—Patrick F Brinson
(74) *Attorney, Agent, or Firm*—Christensen O'Connor Johnson Kindness PLLC

(57) ABSTRACT

A closure for a plumbing cleanout includes a riser pipe having an interior surface defining an interior bore. A cylindrical plug is provided having a first end, a second end, and an exterior surface. A peripheral flange is positioned at the second end of the cylindrical plug which is adapted to limit the distance the first end of the cylindrical plug can be inserted into the interior bore of the riser pipe. Seals are provided for sealing fluids within the riser pipe. Stops are provided for limiting axial movement of the cylindrical plug relative to the riser pipe.

13 Claims, 7 Drawing Sheets

CLOSURE FOR A PLUMBING CLEANOUT

FIELD OF THE INVENTION

The present invention relates to a closure for use on a cleanout pipe of a plumbing system.

BACKGROUND OF THE INVENTION

There are various types of plumbing installations which require cleanout pipes. As their name implies, cleanout pipes are used for access when there is a need to service the plumbing installation. Open ends of these cleanout pipes are closed with closures, in order to prevent dirt or other debris from getting into the plumbing installations. In some installations, these closures must be capable of releasing pressure. In other installations, the closures must be capable of containing pressure.

SUMMARY OF THE INVENTION

What is required is a closure for a plumbing cleanout, which is sufficiently versatile as to permit use in a variety of plumbing installations.

According to the present invention there is provided a closure for a plumbing cleanout, which includes a riser pipe having an interior surface defining an interior bore. A cylindrical plug is provided having a first end, a second end, and an exterior surface. A peripheral flange is positioned at the second end of the cylindrical plug which is adapted to limit the distance the first end of the cylindrical plug can be inserted into the interior bore of the riser pipe. Sealing means are provided for sealing fluids within the riser pipe. Stop means are provided for limiting axial movement of the cylindrical plug relative to the riser pipe.

BRIEF DESCRIPTION OF THE DRAWINGS

These and other features of the invention will become more apparent from the following description in which reference is made to the appended drawings, the drawings are for the purpose of illustration only and are not intended to in any way limit the scope of the invention to the particular embodiment or embodiments shown, wherein.

DETAILED DESCRIPTION OF THE PREFERRED EMBODIMENT

Figure 1:
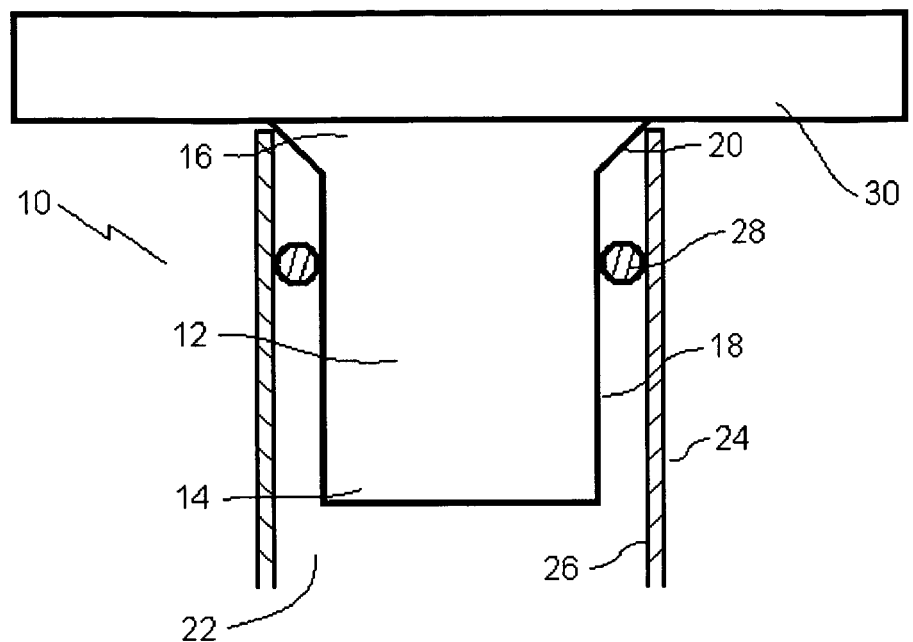
FIG. 1 is a side view, in section, of a closure for a plumbing cleanout according to the present invention.

The preferred embodiment, a closure for a plumbing cleanout generally identified by reference numeral 10, will now be described with reference to FIGS. 1 through 5. Alternative embodiments will be described with reference to FIGS. 6 through 13.

Structure and Relationship of Parts:

Referring now to FIG. 1, there is shown a closure for a plumbing cleanout 10. A cylindrical plug 12 has a first end 14, a second end 16, and an exterior surface 18. There is a peripheral flange 20 at second end 16 of cylindrical plug 12 which is adapted to limit the distance first end 14 of cylindrical plug 12 can be inserted into the interior bore 22 of the riser pipe 24, defined by interior surface 26. A free floating "O" ring seal 28 engages exterior surface 18 of cylindrical plug 12 and interior surface 26 of riser pipe 24. "O" ring seal 28 is adapted to preclude fluids passing between exterior 18 of cylindrical plug 12 and interior 26 of riser pipe 24. An overlying cap 30 is adapted to serve as stop means for limiting axial movement of cylindrical plug 12 relative to riser pipe 24. As shown in FIG. 1, overlying cap 30 is integrally formed with cylindrical plug 12.

Figure 2:
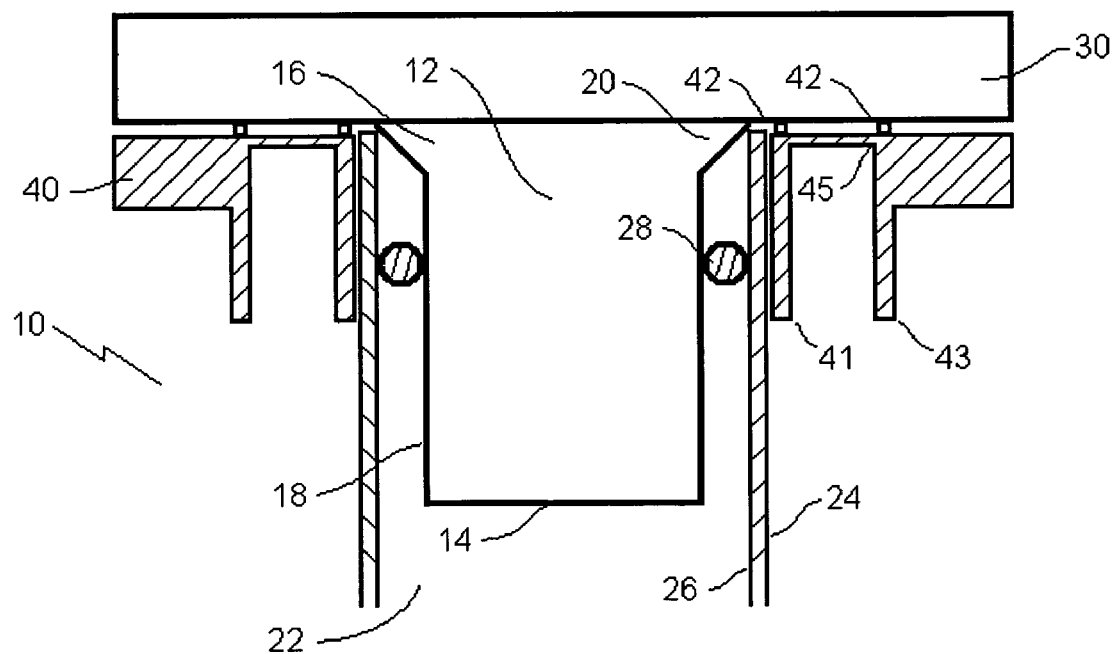
FIG. 2 is a side view, in section, of the closure of FIG. 1 with stop means.
Figure 11:
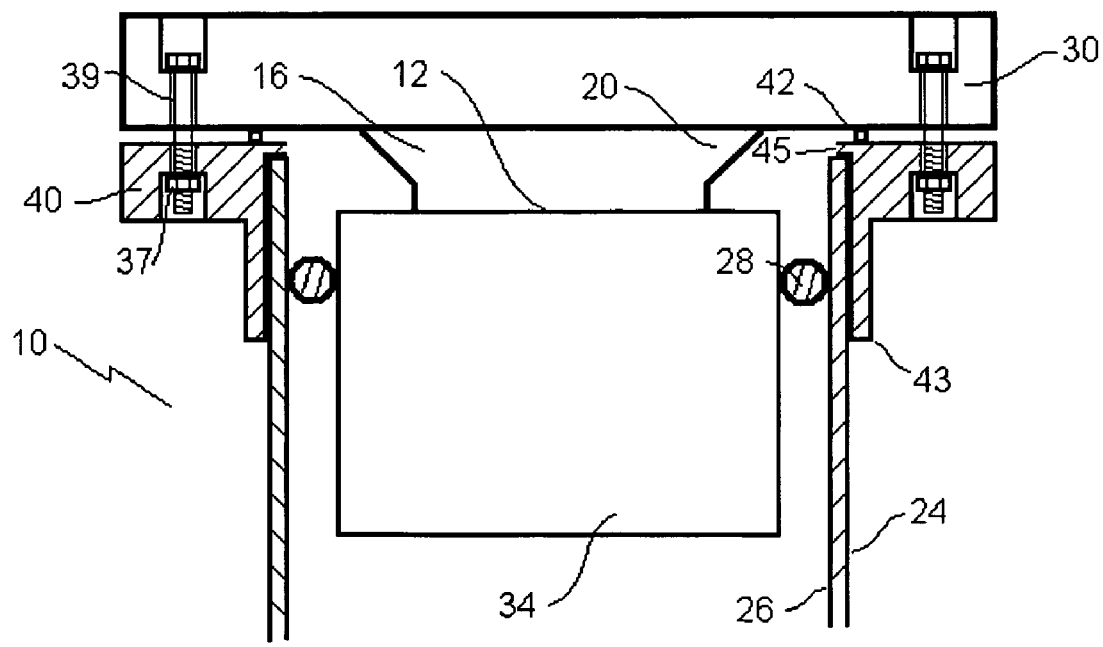
FIG. 11 is a side view, in section, of the closure with a larger bore rise pipe.

Referring now to FIG. 2, riser pipe 24 has a peripheral flange 40 such that overlying cap 30 engages peripheral flange 40. Seals 42 are provided between peripheral flange 40 and overlying cap 30. Peripheral flange 40 has an inner concentric skirt 41 and an outer concentric skirt 43. Each concentric skirt 41 and 43 is adapted to fit a riser pipe 24 with a different diameter. It is preferred that at least one of concentric skirts 41 and 43 is secured by a frangible connection 45, such that the concentric skirt which is deemed redundant is removable. As shown in FIG. 2, inner skirt 41 is used to attached to riser pipes 24 with smaller diameters, such as 2", and can be removed by breaking frangible connection 45 such that outer skirt 43 can be connected to riser pipes 24 with larger diameters, such as 3" without impeding flow. The connection may be made using an adhesive such as glue. FIG. 11 shows a larger diameter riser pipe 24 installed with flange 40, and inner skirt 41 removed.

Figure 3:
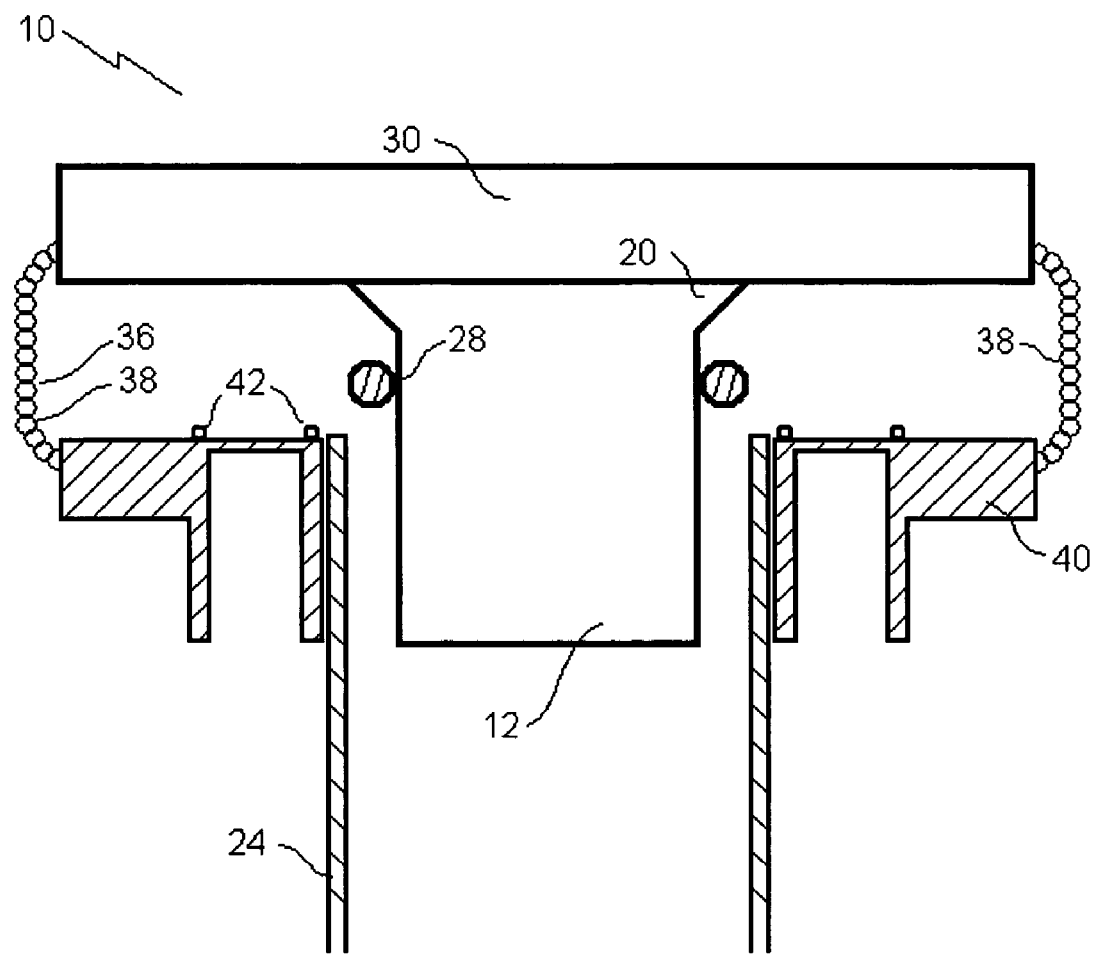
FIG. 3 is a side view, in section of the closure with tethers.
Figure 4:
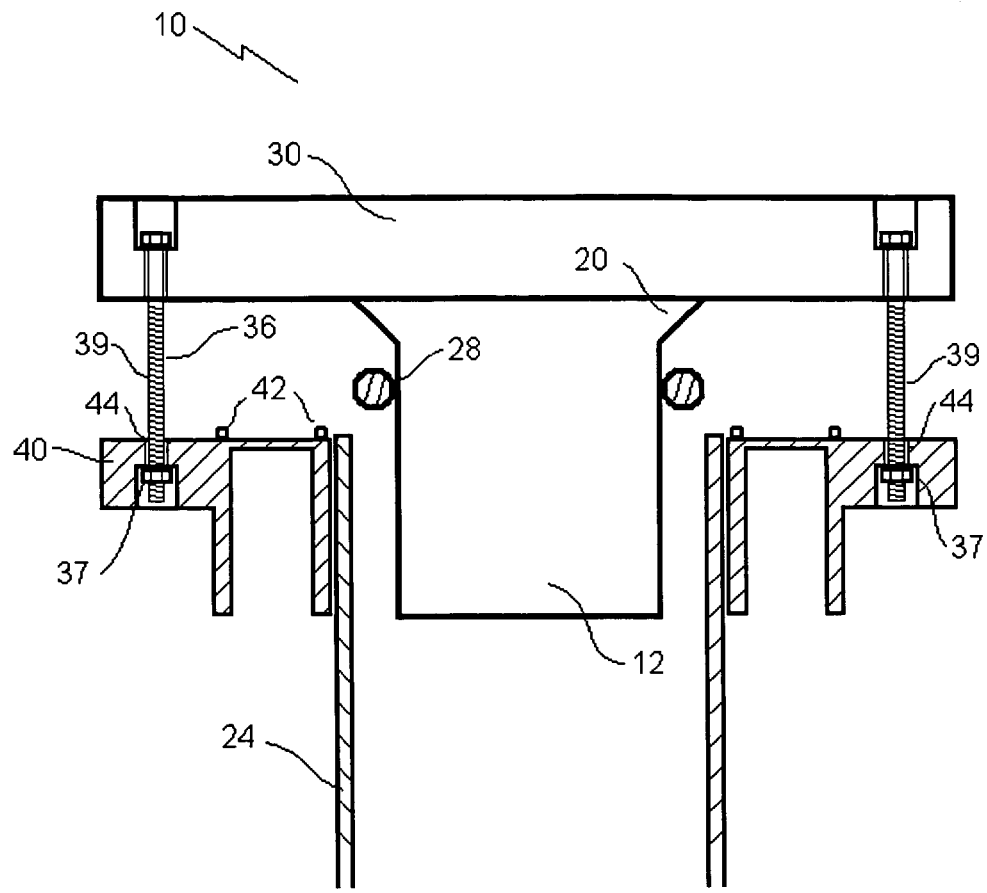
FIG. 4 is a side view, in section of the closure inserted in a riser pipe with an alternative tether.

Overlying cap 30 may be secured to riser pipe 24 by tethers 36 adapted to serve as stop means for limiting axial movement of cylindrical plug 12 relative to riser pipe 24. Referring to FIG. 3, a chain 38 connects overlying cap 30 to peripheral flange 40 of riser pipe 24. Referring to FIG. 4, tether 36 is shown to be a nut 37 and a bolt 38 on each side, connected through apertures 44 in peripheral flange 40. In each case, overlying cap 30 is able to move relative to riser pipe 24 until such movement is stopped by tethers 36. It will be understood that other types of tethers may exists, while combinations of chains and nuts and bolts are also possible, and that the number of tethers 36 may vary, although two is preferable.

Referring again to FIG. 4, peripheral flange 40 on riser pipe 24 has apertures 44. Overlying cap 30 is secured to peripheral flange 40 by nuts 37 and bolts 38, where nuts 37 and bolts 38 serve as stop means 46 in addition to tethers 36. Referring to FIG. 11, by tightening nuts 37 and bolts 38 onto flange 40, overlying cap 30 can be securely fixed against movement as pressure increases. Referring again to FIG. 4, by loosening nuts 37 and bolts 38, overlying cap 30 is able to move relative to flange 40 on riser pipe 24 for the length of bolts 38 until such movement is stopped by engagement with flange 40.

Figure 5:
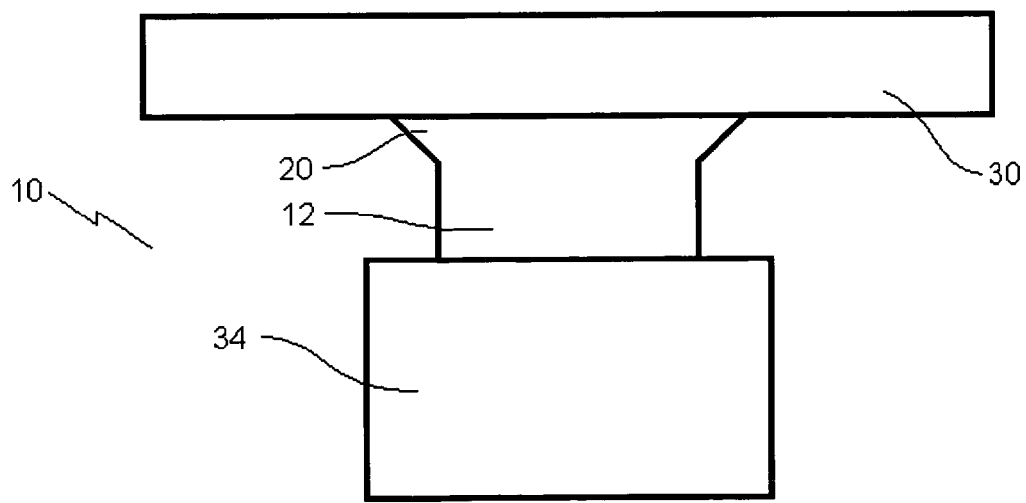
FIG. 5 is a side view, in section of the closure adapted for a larger pipe.

Referring now to FIG. 5, there is shown an appendage 34 about cylindrical plug 12. Appendage 34 is adapted to fit a riser pipe 24 with a larger interior bore 22. Appendage 34 is removable when cylindrical plug 12 is used with a riser piper 24 having a smaller interior bore 22. Referring to FIG. 11, appendage 34 is shown installed with larger riser pipe 24.

Figure 6:
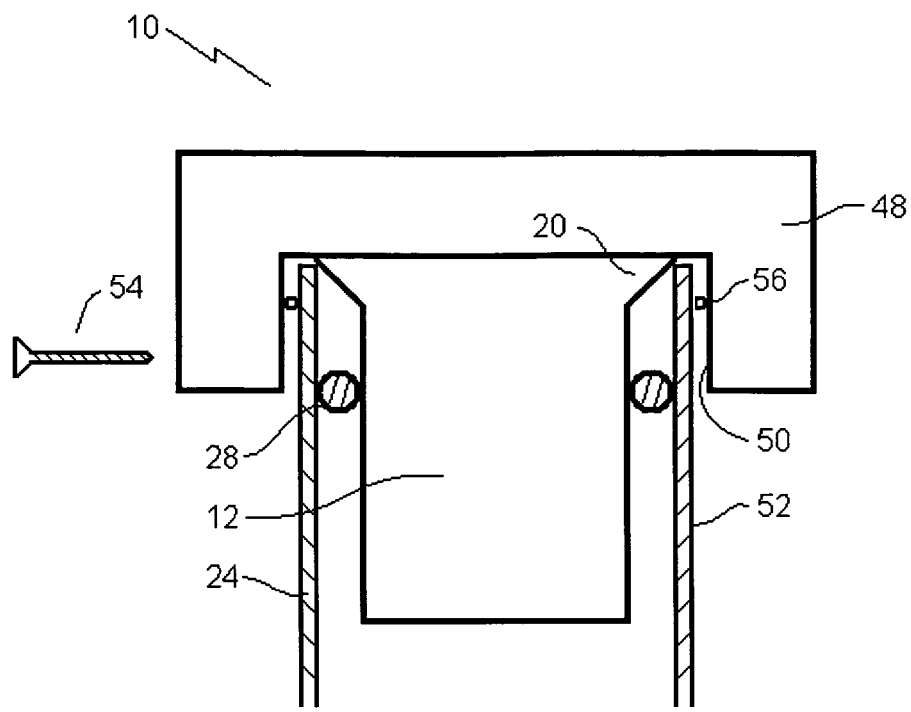
FIG. 6 is a side view, in section of an alternative of the closure.
Figure 7:
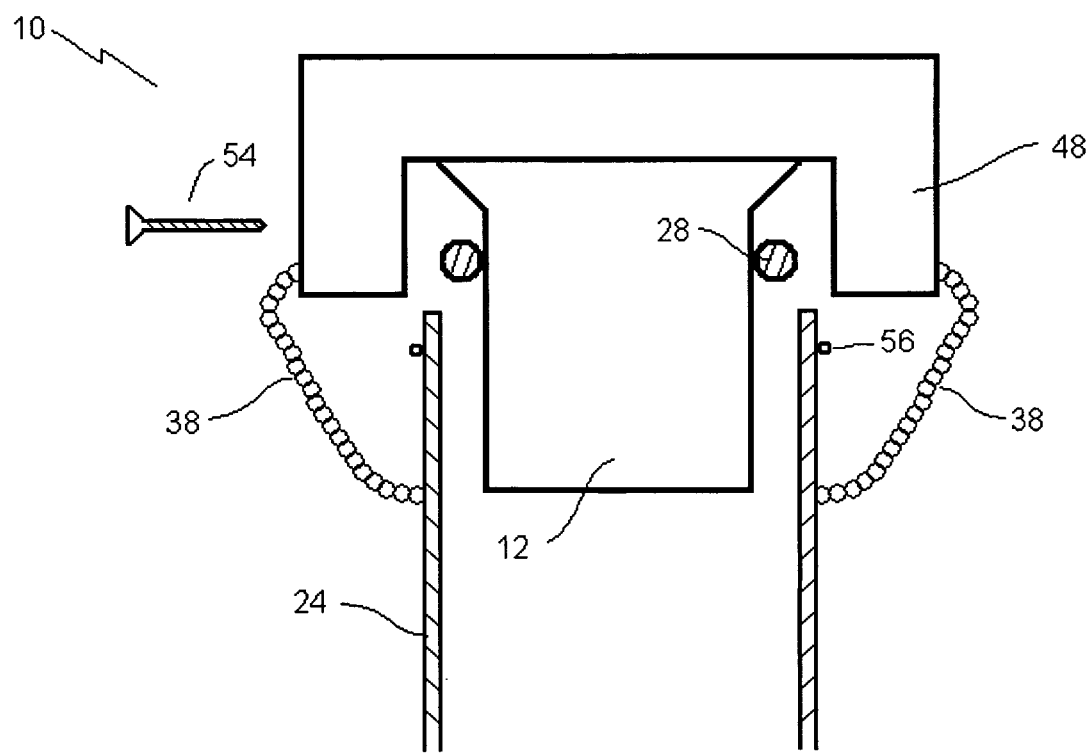
FIG. 7 is a side view, in section of the alternative of the closure in FIG. 6 with tethers.

Referring now to FIG. 6, an alternative overlying cap 48 is shown with an interior surface 50. An "O" ring seal 56 is provided which is adapted to seal interior surface 50 of overlying cap 48 and the exterior surface 52 of riser pipe 24. This arrangement makes it possible to provide a set screw 54 that extends through overlying cap 48 into riser pipe 24, thereby fixing cylindrical plug 12 against movement as pressure increases. Referring now to FIG. 7, overlying cap 48 is shown tethered to riser pipe 24 by chain 38.

Figure 8:
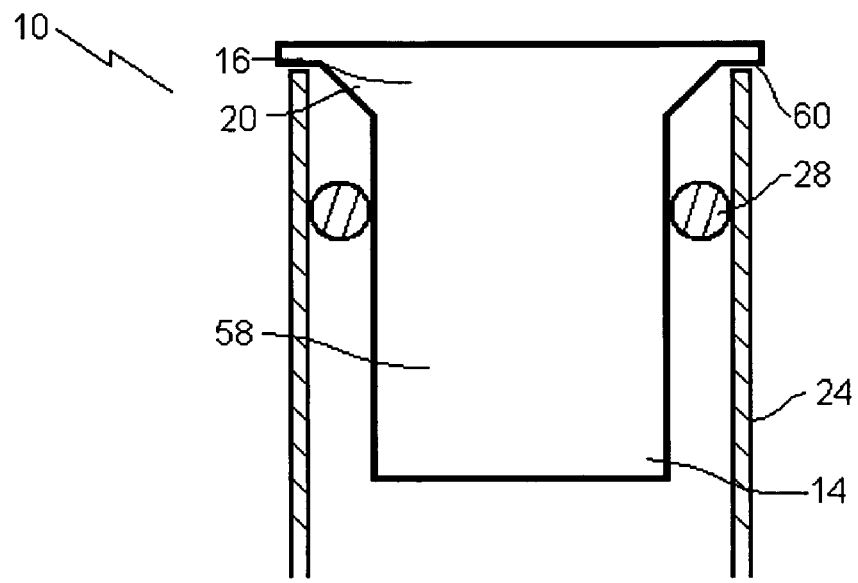
FIG. 8 is a side view, in section of another alternative of the closure.
Figure 9:
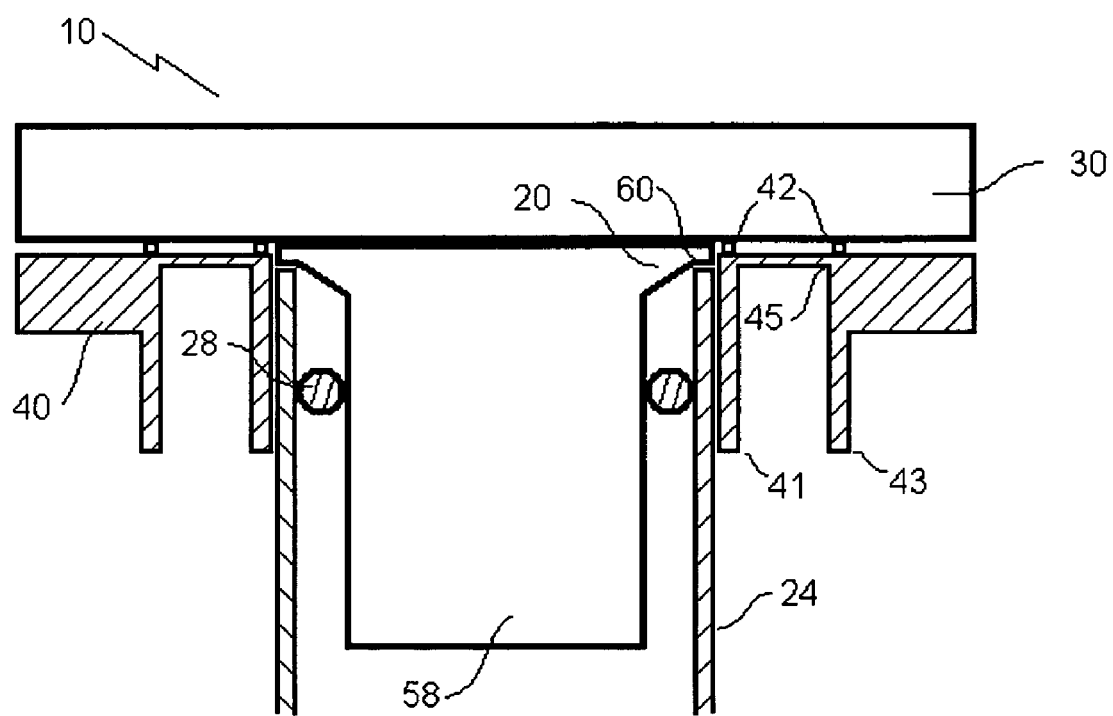
FIG. 9 is a side view, in section of the alternative of the closure in FIG. 8 with stop means.
Figure 10:
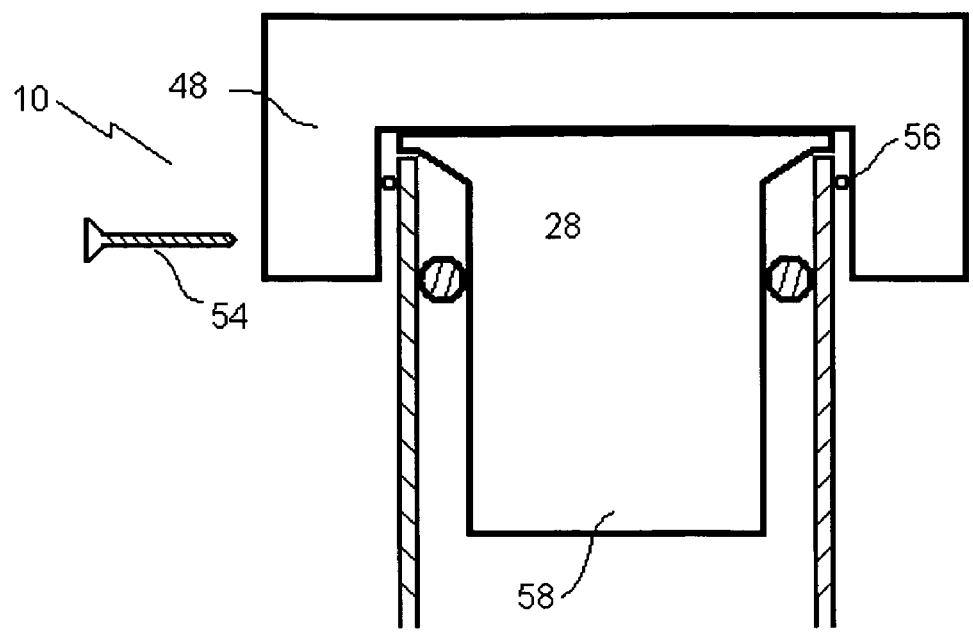
FIG. 10 is a side view, in section of another alternative of the closure.

Referring now to FIG. 8, cylindrical plug 58 is shown to be discrete from overlying cap 30. In this case, flange 20 may have a horizontal section 60 to provide a better connection. Referring to FIG. 9, cylindrical plug 58 is shown with overlying cap 30 and riser pipe 24 having peripheral flange 40. Referring to FIG. 10, cylindrical plug 58 is shown with alternative overlying cap 48.

Figure 12:
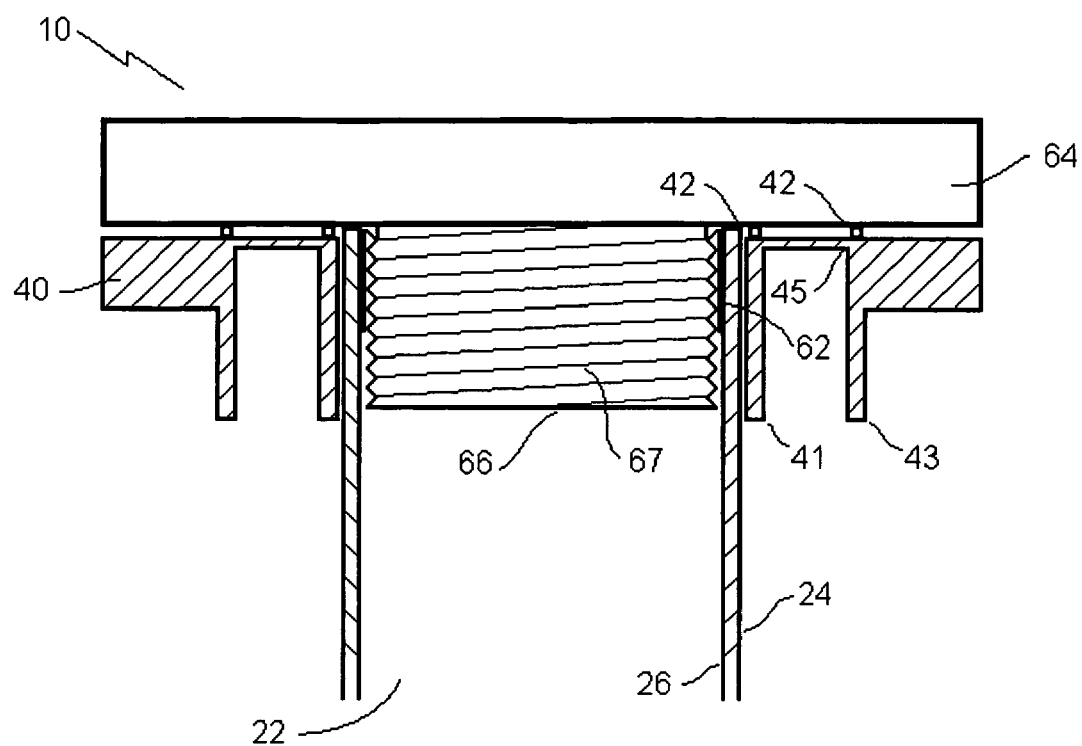
FIG. 12 is a side view, in section of another alternative of the closure.
Figure 13:
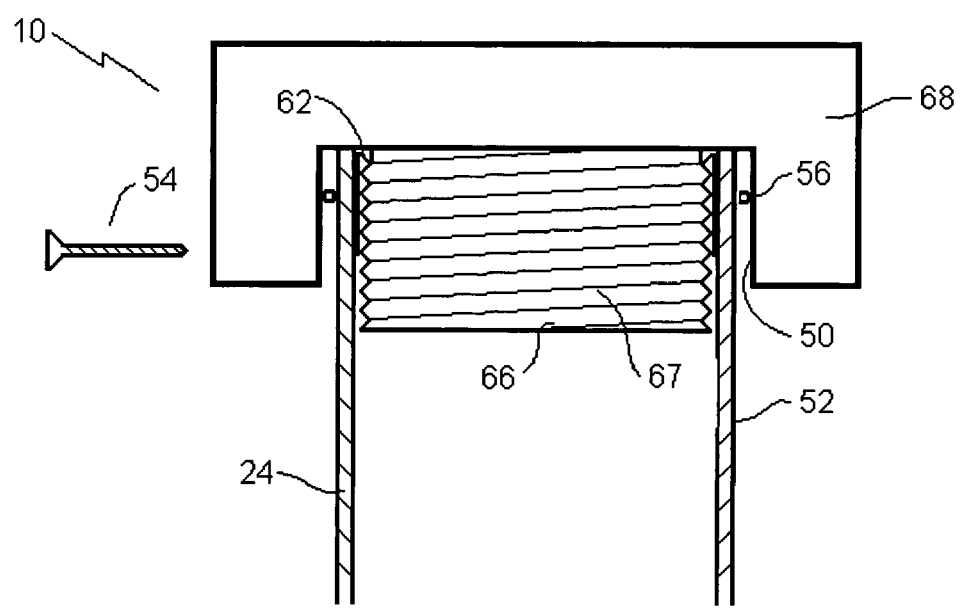
FIG. 13 is a side view, in section, of the closure illustrated in FIG. 12.

Referring now to FIG. 12, an alternative to cylindrical plug 12 is shown, where internal threads 62 are attached to the interior bore 22 of the riser pipe 24, such that a cap 64 with a cylindrical plug 66 having exterior threads 67 corresponding to the internal threads 62 may be secured by engaging the exterior threads 67 of the cylindrical plug 66 and internal threads 62. As well, referring to FIG. 13, an overlying cap 68 with a cylindrical plug 66 having external threads 67 may be used, where the cap 68 is secured to the riser pipe 24 by a set screw 54. Referring to FIGS. 12 and 13, seals 42 and 56 are included to keeps threads 67 and 62 clean.

Operation:

The use of this device will now be discussed with reference to FIGS. 1 to 13. Referring to FIG. 2, closure 10 is installed with flange 40 attached to rise pipe 24, where "O" ring seal 28 provides a seal between outer surface 18 of plug 12 and inner surface 26 of rise pipe 24. If desired, this connection can be supplemented by chains 38 as shown in FIG. 3 or nuts 37 and bolts 39 as shown in FIG. 4 to allow pressure release. Additionally, nuts 37 and bolts 39 can be tightened to restrict movement as shown in FIG. 11. Referring to FIG. 6, a set screw 54 may be used through overlying cap 48 to fix cylindrical plug 12 against movement as pressure increases. If a larger rise pipe 24 is used, appendage 34 may be used as shown in FIG. 11 and inner frangible flange 41 may be removed. Referring to FIGS. 12 and 13, an overlying cap 64 or 68, respectively, may be used with a cylindrical plug 66 having external threads 67, which engage internal threads 62 in interior bore 22 to engage the overlying cap 64 or 68 with the riser pipe 24.

In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be one and only one of the elements.

It will be apparent to one skilled in the art that modifications may be made to the illustrated embodiment without departing from the spirit and scope of the invention as hereinafter defined in the Claims.

The embodiments of the invnetion in which an exclusive property or privilege is claimed are defined as follows:

1. A closure for a plumbing cleanout, comprising:
    a riser pipe having an interior surface defining an interior bore and an exterior surface;
    a cylindrical plug having a first end positioned in the interior bore of the riser pipe, a second end, an exterior surface and means at the second end of the cylindrical plug which is adapted to limit the distance the first end of the cylindrical plug can be inserted into the interior bore of the riser pipe; and
    an overlying cap positioned overlying the interior bore of the riser pipe, the overlying cap having an interior surface, an "O" ring seal being provided which is adapted to seal the interior surface of the overlying cap and the exterior surface of the riser pipe to seal fluids within the riser pipe;
    wherein at least one set screw extends through the overlying cap into the exterior surface of the riser pipe, thereby fixing the cylindrical plug against movement as pressure increases.

2. A closure for a plumbing cleanout, comprising:
    a riser pipe having an interior surface defining an interior bore;
    a cylindrical plug having a first end positioned in the interior bore of the riser pipe, a second end, an exterior surface and one of an overlying cap or a peripheral flange at the second end of the cylindrical plug which is adapted to limit the distance the first end of the cylindrical plug can be inserted into the interior bore of the riser pipe, the cylindrical plug being capable of limited outward axial movement relative to the riser pipe in response to pressure build up within the riser pipe;
    sealing means for sealing fluids within the riser pipe;
    stop means for limiting outward axial movement of the cylindrical plug relative to the riser pipe; and
    the stop means being tethers which extend between the overlying cap or peripheral flange and the riser pipe, the cylindrical plug being able to move relative to the riser pipe until such movement is stopped by the tethers.

3. A closure for a plumbing cleanout, comprising:
    a riser pipe having a peripheral flange and an interior surface defining an interior bore;
    a cylindrical plug having a first end positioned in the interior bore of the riser pipe, a second end, an exterior surface and one of an overlying cap or a peripheral flange at the second end of the cylindrical plug which is adapted to limit the distance the first end of the cylindrical plug can be inserted into the interior bore of the riser pipe, the cylindrical plug being capable of limited outward axial movement relative to the riser pipe in response to pressure build up within the riser pipe;
    sealing means for sealing fluids within the riser pipe; and
    stop means for limiting outward axial movement of the cylindrical plug relative to the riser pipe;
    wherein the peripheral flange on the riser pipe has apertures, the overlying cap or peripheral flange on the cylindrical plug being secured to the riser pipe peripheral flange by nuts and bolts, the nuts and bolts serving as stop means such that by tightening the nuts and bolts onto the flange the cylindrical plug can be securely fixed against movement as pressure increases, and by loosening the nuts and bolts the cylindrical plug is able to move relative to the flange on the riser pipe for the length of the bolts until such movement is stopped by engagement with the riser pipe flange.

4. The closure as defined in claim 3, wherein the riser pipe peripheral flange is separate from the riser pipe and is adapted to be secured by glue to the riser pipe, the peripheral flange having more than one concentric skirt, each of the more than one concentric skirt being adapted to fit a riser pipe with a different diameter, at least one of the more than one concentric skirts being secured by a frangible connection, such that the concentric skirt which is deemed redundant is removable.

5. A closure for a plumbing cleanout, comprising:

a riser pipe having an interior surface defining an interior bore;

a cylindrical plug having a first end positioned in the interior bore of the riser pipe, a second end, an exterior surface and a peripheral flange at the second end of the cylindrical plug which is adapted to limit the distance the first end of the cylindrical plug can be inserted into the interior bore of the riser pipe, the cylindrical plug being capable of limited outward axial movement relative to the riser pipe in response to pressure build up within the riser pipe;

a free floating "O"0 ring seal engaging the exterior surface of the cylindrical plug and the interior surface of the riser pipe, the "O" ring seal being adapted to preclude fluids passing between the exterior of the cylindrical plug and the interior of the riser pipe; and an overlying cap adapted to serve as stop means for limiting outward axial movement of the cylindrical plug relative to the riser pipe.

6. The closure as defined in claim 5, wherein the overlying cap has an interior surface, the riser pipe has an exterior surface, an "O" ring seal being provided which is adapted to seal the interior surface of the overlying cap and the exterior surface of the riser pipe.

7. The closure as defined in claim 5, wherein at least one set screw extends through the overlying cap into the riser pipe, thereby fixing the cylindrical plug against movement as pressure increases.

8. The closure as defined in claim 5, wherein the overlying cap is discrete from the cylindrical plug.

9. The closure as defined in claim 5, wherein the overlying cap is integrally formed with the cylindrical plug.

10. A closure for a plumbing cleanout, comprising:

a riser pipe having an interior surface defining an interior bore;

a cylindrical plug having a first end positioned in the interior bore of the riser pipe, a second end, an exterior surface and a peripheral flange at the second end of the cylindrical plug which is adapted to limit the distance the first end of the cylindrical plug can be inserted into the interior bore of the riser pipe, the cylindrical plug being capable of limited outward axial movement relative to the riser pipe in response to pressure build up within the riser pipe;

a free floating "O" ring seal engaging the exterior surface of the cylindrical plug and the interior surface of the riser pipe, the "O" ring seal being adapted to preclude fluids passing between the exterior of the cylindrical plug and the interior of the riser pipe;

an overlying cap secured to the riser pipe by tethers adapted to serve as stop means for limiting outward axial movement of the cylindrical plug relative to the riser pipe, the overlying cap being able to move relative to the riser pipe until such movement is stopped by the tethers.

11. The closure as defined in claim 10, wherein the tethers are one of chains, bolts, or a combination of at least one chain and at least one bolt.

12. The closure as defined in claim 10, wherein the riser pipe has a peripheral flange and the overlying cap engages the peripheral flange, seals being provided between the peripheral flange and the overlying cap.

13. The closure as defined in claim 11, wherein the peripheral flange on the riser pipe has apertures, the overlying cap being secured to the peripheral flange by nuts and bolts, the nuts and bolts serving as stop means such that by tightening the nuts and bolts onto the flange the overlying cap can be securely fixed against movement as pressure increases, and by loosening the nuts and bolts the overlying cap is able to move relative to the flange on the riser pipe for the length of the bolts until such movement is stopped by engagement with the flange.

* * * * *

UNITED STATES PATENT AND TRADEMARK OFFICE
CERTIFICATE OF CORRECTION

PATENT NO. : 7,762,282 B2  Page 1 of 1
APPLICATION NO. : 11/135006
DATED : July 27, 2010
INVENTOR(S) : G. Coscarella It is certified that error appears in the above-identified patent and that said Letters Patent is hereby corrected as shown below:

COLUMN     LINE         ERROR

5        13         "a free floating "O" 0 ring" should read --a free floating
(Claim 5, line 13)       "O" ring--

Signed and Sealed this

Sixteenth Day of November, 2010

David J. Kappos
*Director of the United States Patent and Trademark Office*